(12) United States Patent
Kaligian, II et al.

(10) Patent No.: US 7,516,909 B2
(45) Date of Patent: Apr. 14, 2009

(54) CONTINUOUS SLURRY DISPENSER APPARATUS

(75) Inventors: Raymond A. Kaligian, II, Geneva, IL (US); James E. Messer, Westlake, OH (US); Dennis Lettkeman, Watonga, OK (US); Salvatore C. Immordino, Trevor, WI (US); Timothy Ross, Kannapolis, NC (US)

(73) Assignee: United States Gypsum Company, Chicago, IL (US)

( * ) Notice: Subject to any disclaimer, the term of this patent is extended or adjusted under 35 U.S.C. 154(b) by 723 days.

(21) Appl. No.: 11/050,309

(22) Filed: Feb. 3, 2005

(65) Prior Publication Data

US 2005/0127208 A1 Jun. 16, 2005

Related U.S. Application Data

(63) Continuation-in-part of application No. 09/918,940, filed on Jul. 31, 2001, now abandoned, which is a continuation-in-part of application No. 09/505,455, filed on Feb. 11, 2000, now Pat. No. 6,273,345.

(51) Int. Cl.
  *B05B 7/06* (2006.01)
(52) U.S. Cl. .................. 239/432; 239/422; 239/433; 239/428; 239/419.3
(58) Field of Classification Search .............. 239/419.3, 239/427, 428, 433, 424, 407, 418, 422; 60/779, 60/39.094
  See application file for complete search history.

(56) References Cited

U.S. PATENT DOCUMENTS

| 2,305,840 | A |   | 12/1942 | Brown et al. |        |
|-----------|---|---|---------|--------------|--------|
| 3,049,439 | A |   | 8/1962  | Coffman      |        |
| 3,073,534 | A |   | 1/1963  | Hampshire    |        |
| 3,565,345 | A |   | 2/1971  | Moltzan      |        |
| 3,874,417 | A |   | 4/1975  | Clay         |        |
| 4,173,305 | A | * | 11/1979 | Blankenship  | 239/79 |
| 4,193,773 | A |   | 3/1980  | Staudinger et al. |   |
| 4,239,397 | A |   | 12/1980 | Sandell et al. |     |
| 4,407,431 | A | * | 10/1983 | Hutter, III  | 222/1  |

(Continued)

FOREIGN PATENT DOCUMENTS

CH          563511          6/1975

(Continued)

*Primary Examiner*—Len Tran
*Assistant Examiner*—Trevor E McGraw
(74) *Attorney, Agent, or Firm*—Greer, Burns & Crain, Ltd.; David F. Janci, Esq.; Pradip Sahu, Esq.

(57) ABSTRACT

An apparatus for mixing an additive into a fluid to form a settable mixture includes a main fluid passageway having an inlet for receiving a supply of the fluid and an outlet for dispensing the fluid, the passageway having a longitudinal axis. The apparatus includes a control valve defining a portion of the main fluid passageway and configured for selectively controlling the flow of fluid in the passageway, an additive injector disposed in the passageway and having an emitter disposed in close relationship with the axis and oriented toward the outlet. A static mixer is disposed between the injector and the outlet for enhancing the uniform mixing of the additive and the fluid. Connection points between the inlet, the valve and the static mixer are configured for smooth transition of fluid and the prevention of at least one of the collection and premature setting of the mixture.

18 Claims, 6 Drawing Sheets

U.S. PATENT DOCUMENTS

| | | | |
|---|---|---|---|
| 4,411,388 A | 10/1983 | Muck | |
| 4,421,797 A | 12/1983 | Koehne | |
| 4,824,017 A * | 4/1989 | Mansfield | 239/9 |
| 4,891,249 A | 1/1990 | McIntyre | |
| 4,934,596 A | 6/1990 | Hilton | |
| 4,986,667 A | 1/1991 | Berger | |
| 5,093,058 A | 3/1992 | Harmon et al. | |
| 5,133,500 A * | 7/1992 | Simpson | 239/150 |
| 5,143,296 A | 9/1992 | Saurwein et al. | |
| 5,197,800 A * | 3/1993 | Saidman et al. | 366/136 |
| 5,224,654 A | 7/1993 | Von Eckardstein | |
| 5,419,491 A | 5/1995 | Breitsprecher | |
| 5,443,796 A * | 8/1995 | Coeling et al. | 422/129 |
| 5,623,995 A * | 4/1997 | Smagac | 169/30 |
| 6,056,822 A | 5/2000 | Jefferson et al. | |
| 6,065,822 A * | 5/2000 | Sarraf | 347/15 |
| 6,273,345 B1 * | 8/2001 | Kaligian et al. | 239/419.3 |
| 6,322,000 B1 * | 11/2001 | Scarpa et al. | 239/112 |
| 6,393,827 B1 * | 5/2002 | Nakamoto | 60/39.094 |
| 6,438,963 B1 * | 8/2002 | Traver et al. | 60/779 |

FOREIGN PATENT DOCUMENTS

FR 2302789 10/1976

\* cited by examiner

CONTINUOUS SLURRY DISPENSER APPARATUS

RELATED APPLICATION

This application is a Continuation-in-Part of U.S. Ser. No. 09/918,940, filed on Jul. 31, 2001 now abandoned, which is a Continuation-In-Part of U.S. Ser. No. 09/505,455, filed on Feb. 11, 2000 and entitled "High Performance Slurry Spray Machine", now U.S. Pat. No. 6,273,345, issued on Aug. 14, 2001.

BACKGROUND OF THE INVENTION

The present invention relates generally to equipment for mixing and dispensing settable slurries in which a setting agent is mixed with a settable slurry in a way that premature setting is prevented. More specifically, the present invention provides a slurry mixing and dispensing apparatus which is configured for continuously introducing a setting agent such as an accelerator into a flowing plaster slurry and thoroughly mixing the setting agent into the slurry without causing premature setting in the apparatus.

Plaster slurry equipment is used for the production of cast or molded plaster products such as, but not limited to, figurines, artistic novelties, household interior trim moldings and electric switch plates, trophy bases, dinnerware, industrial prototypes of manufactured products and the like. Existing plaster slurry processing techniques are limited to continuous processing equipment, and further, are limited to plaster and gypsum cement products where slurry viscosities are relatively low. Highly formulated gypsum cement products tend to be much more viscous in nature, and the existing equipment designs do not provide adequate mix processing required by the formulation (i.e. sift/soak/mix). Further, all known equipment is typically limited to a continuous output and are incapable of stop and go operation. Conventional mixing and dispensing equipment relies on volumetric powder metering and inadequate mixing using an open throat style progressive cavity pump. In such applications, reliance on relatively long feed hoses is necessary to obtain adequate mixing. Typically, production is presently based on manually mixed batches, and proceeds until the current batch of slurry is expended. Then production is suspended until another batch can be made. Batches of formulated slurry are continually agitated by mechanical mixers to avoid premature setting of the plaster slurry.

Another drawback of conventional slurry dispensing apparatus used for plaster slurries is a lack of adequate stop and start control for the dispensing of such slurries, such that material is wasted when the dispenser "weeps" slurry after output is meant to be stopped. Still another drawback of conventional plaster slurry dispensing apparatus is inadequate control over the dispensing of setting agents or accelerators. Incomplete mixing of the setting agent with the slurry causes uneven setting and inferior products. Premature setting in the dispensing apparatus causes clogged equipment, which requires disruption of the production line while the equipment is cleaned of the set plaster.

Accordingly, a first object of the present invention is to provide an improved slurry mixing and dispensing apparatus which is configured for shift-based rather than batch-based operation.

Another object of the present invention is to provide an improved slurry mixing and dispensing apparatus which is configured for minimizing the accumulation and premature setting of the gypsum slurry in the dispenser apparatus.

Still another object of the present invention is to provide an improved slurry mixing and dispensing apparatus which features controllable, relatively rapid stop and start operation.

Yet another object of the present invention is to provide an improved slurry spray and/or dispensing apparatus which incorporates an accelerant into the slurry without internal clogging, and so that the accelerant is generally uniformly distributed in the slurry.

A further object of the present invention is to provide an improved slurry spray and/or dispensing apparatus which emits or ejects the slurry at a relatively constant rate to achieve a more uniform sprayed substrate.

A still further object of the present invention is to provide an improved slurry spray and/or dispensing apparatus in which the component parts such as pumps and valves are designed to accommodate the unique characteristics of plaster slurries for efficient industrial applications.

Yet a further object of the present invention is to provide an improved slurry spray and/or dispensing apparatus which features a pneumatically operated control and valve system for operator safety and for more controllable output of the sprayed slurry.

BRIEF SUMMARY OF THE INVENTION

The above-listed objects are met or exceeded by the present continuous slurry dispenser apparatus, which is configured for providing clog-free, shift-type continuous operation. Particular care is taken in the design of the present apparatus for minimizing the accumulation of slurry, which in prior devices results in premature setting of the slurry and the clogging of passageways in the dispensing apparatus.

More specifically, the present invention provides an apparatus for mixing an additive into a fluid to form a settable mixture including a main fluid passageway having an inlet for receiving a supply of the fluid and an outlet for dispensing the fluid, the passageway having a longitudinal axis. The apparatus includes a control valve defining a portion of the main fluid passageway and configured for selectively controlling the flow of fluid in the passageway, an additive injector disposed in the passageway between the valve and the outlet. An emitter on the injector is disposed in close relationship with the axis and is oriented toward the outlet. A static mixer is disposed between the injector and the outlet for enhancing the uniform mixing of the additive and the fluid. Connection points between the inlet, the valve and the static mixer are configured for smooth transition of fluid and the prevention of at least one of the collection and premature setting of the mixture in the passageway.

In another embodiment, a high performance slurry spray machine which features an applicator or spray gun having two points of atomization by compressed air. The first atomization point introduces compressed air into the slurry to increase its spray ability. A second atomization point is preferably located at the slurry spray outlet of the spray gun, and achieves two goals. First, the slurry is still further atomized, for a more even application. Second, the accelerant is vaporized and blended with compressed air at the second atomization point to prevent in-gun clogging while providing a more uniform distribution of accelerant in the sprayed slurry. Specially designed manifolds and outlet nozzles are provided for atomizing the slurry and for mixing the vaporized and atomized accelerant with the main slurry flow. An open-topped slurry container coupled to a positive displacement pump provides constant feed flow of this type of slurry.

Another feature of the present spray apparatus is the inclusion of a dampening device in applications where a pulsating-type pump is employed. The dampener evens out the flow pulses, and is designed to be used with the somewhat abrasive and sometimes relatively viscous plaster slurries. Pneumatically controlled pinch valves are used throughout the apparatus to prevent the clogging through plaster buildup inherent with conventional ball valves.

DETAILED DESCRIPTION OF THE INVENTION

Figure 1:
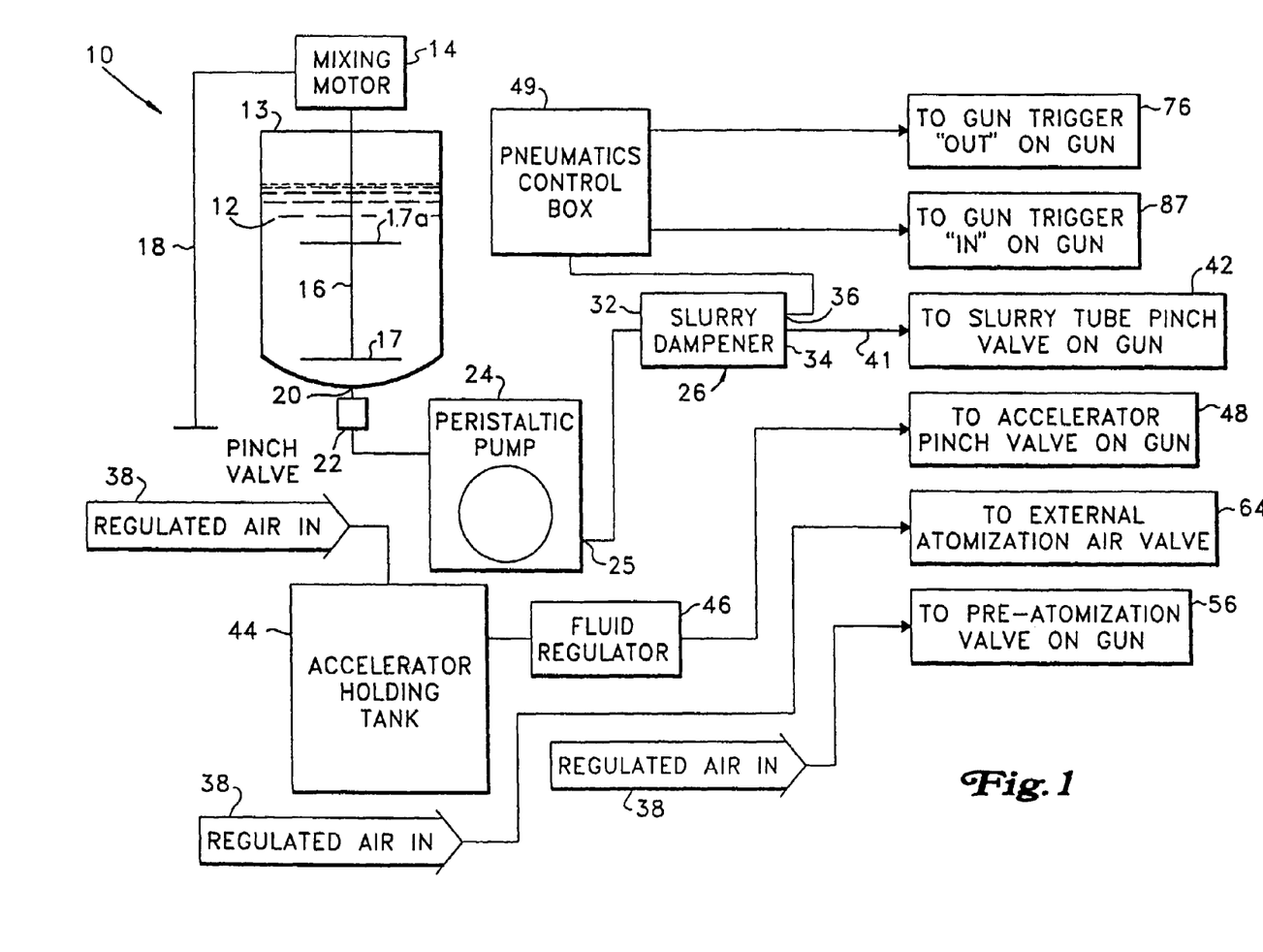
FIG. 1 is a partial schematic of the present high performance slurry spray system.

Referring now to FIG. 1, the present high performance slurry spray system is generally designated 10 and is designed for spraying settable slurries, such as plaster or gypsum cement and water slurries in industrial applications. The present apparatus is particularly suitable for applying a thin coating of slurry upon a generally vertical substrate, and achieving a relatively uniform appearing and setting layer. The system 10 includes a slurry mixing and storage tank 12 suitably dimensioned for retaining a supply of slurry. In the present system, it is preferred that alpha or beta calcium sulfate hemihydrate or plaster slurry is used, however other compositions are contemplated, for example slurries containing a mixture of alpha and/or beta calcium sulfate hemihydrate and other non calcium sulfate hemihydrate slurries such as Portland cement blends (sometimes referred to as a gypsum cement), or magnesium phosphate cement formulations, depending on the application. It is also preferred that the mixing and storage tank 12 be made of a lightweight, water and corrosion resistant, sturdy material such as rigid plastic. However, other equivalent materials are contemplated, including stainless steel, fiberglass and aluminum. It is also preferred that the tank 12 have an open top 13 to facilitate pouring of ingredients and for exposure to atmospheric pressure, and a conical or tapered bottom to facilitate complete drainage. It has been found that an open-topped tank facilitates uniform slurry flow rates, especially when coupled to a positive displacement pump, as described below.

A mixing motor 14 with an impeller 16 is provided and mounted relative to the tank 12 so that the impeller can engage the slurry in the tank. In the preferred embodiment, the impeller has two sets of blades, 17 and 17a. The first set 17 is located at a tip of the impeller, and the second set 17a is located approximately midway up the length of the impeller, and preferably about 4 to 5 inches below the level of liquid in the tank 12. It is preferred that the mixing motor 14 be at least of 5 HP capacity, and that the motor and the impeller 16 are mounted to a powered lift 18 for easy loading of the slurry ingredients, and easy cleaning of the tank 12. The lift 18 is configured so that the mixing motor 14 and the impeller 16 may be vertically withdrawn from, or inserted into, the tank 12.

Plaster or gypsum cement slurry is mixed in a plastic tank by means of either an automated weighing process (i.e. load cells), or by a manual batching process, as is known in the art. Also, using known technology, automated mixing/cleaning cycles are also controlled via electro-mechanical methods.

An outlet 20 of the tank 12 is in fluid communication with a valve 22, which in the preferred embodiment is a pneumatically operated pinch valve. While other types of slurry control valves are also contemplated for use with the present system 10, pinch valves are preferred because they do not become clogged with set plaster. Instead, upon entering the valve, the slurry flows through a rubber tube which is surrounded by a pressurized canister. By selective application of pressure, in the preferred embodiment pneumatic pressure, the flow of slurry through the hose can be controlled. Such valves are known in the art, and because of their superior qualities for the present application, have been incorporated into all valving locations of the present system 10 which are potentially exposed to the slurry.

Downstream of the valve 22 is a pump 24, which is in fluid communication with the valve 22 and the tank 12. While a variety of pumps are contemplated for use with the present system, including, but not limited to gear pumps, piston pumps, diaphragm pumps, and progressive cavity pumps, the preferred type of pump in the system 10 is a positive displacement pump, specifically a peristaltic pump, and particularly a high-pressure type using a lubricating bath of glycerin to the internal stator hose. A variable speed DC motor (not shown) supplies power to the pump. Although it emits a pulsating output flow, the moving parts of the peristaltic pump do not become exposed to the settable slurry. A suitable commercial example of a preferred type of pump is the DL Series of pumps manufactured by PCM POMPES, 17 rue Ernest Laval-BP 35, 972173 Vanves Cedex, France. The preferred pump 24 has a minimum flow rate of 84 liters/hr, a maximum flow rate of 20,000 liters/hr and a speed of between 5 to 133 rpm. In the preferred embodiment, an outlet 25 of the pump is configured as a quick connect fitting which is easily disconnected and allows the connection of a garden hose into the system for flushing purposes. Another suitable pump is a progressive cavity positive displacement pump manufactured by Moyno Products, Fluids Handling Division, Robbins & Meyers, Inc., Springfield Ohio. It has been found that the combination of the tank 12 with the open top 13, and the positive displacement pump 24 provided with a dampener as described below has resulted in a generally uniform flow rate of plaster slurry.

The purpose of the pump 24 is to pressurize the slurry in the system, and as acknowledged above, a drawback of peristaltic pumps is the pulsating output flow. If left untreated, this type of flow would result in an uneven flow of slurry upon the substrate, which would be undesirable in the type of targeted industrial application, i.e., the fabrication of large forms for fiberglass or other types of plastic molding. Accordingly, one feature of the present system is to provide a mechanism for dampening the pulses generated by the pump 24 in a way which will be suitable for use with the present type of settable slurry.

Figure 5:
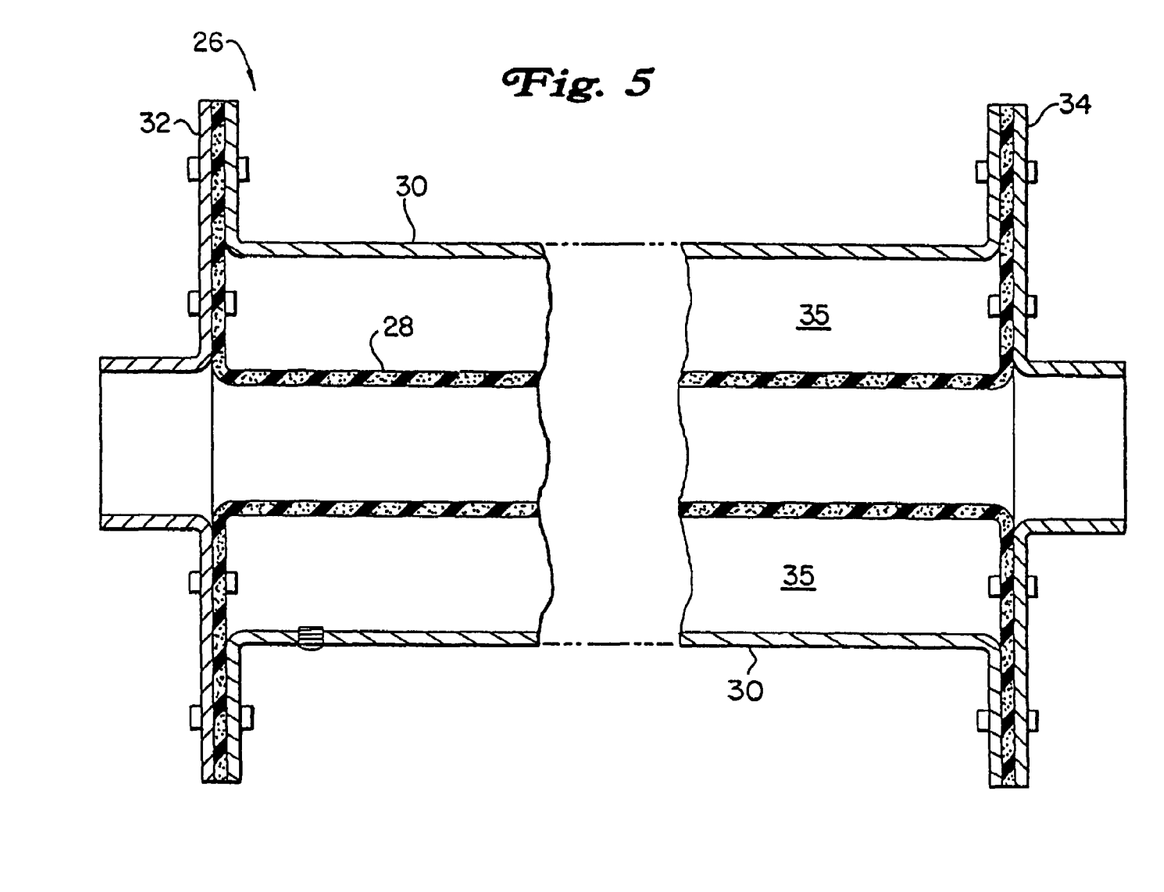
FIG. 5 is a vertical sectional view of the dampener depicted schematically in FIG. 1.

Referring now to FIGS. 1 and 5, an accumulator, surge suppressor or dampening device 26 which is suitable for use with the present system 10 operates under a similar principle as a pinch valve, and includes an inner flexible or rubber-like bladder or tube 28 which is in fluid communication with the pump 24, the valve 22 and the tank 12. A rigid, elongate cylindrical jacket 30 surrounds the tube 28, and is provided with flanged ends 32, 34 which are also sealingly coupled to ends of the tube. It is contemplated that the ends of the tube 28 may be sealingly secured to the flanged ends 32, 34 by chemical adhesive, threaded fasteners and clamps, combinations of the above, or other known fastening technologies. In this manner, a chamber 35 is created about the tube 28. This sealed coupling allows for the introduction of pressurized gas (preferably air) through a pressurized air inlet 36 into the sealed chamber 35. Sufficient pressurized air is introduced from a compressor 38 into the cylindrical jacket 30 to regulate the flow pulses generated by the pump 24. The compressor 38 is preferably capable of providing 100 psi of air @ 30 CFM. It is contemplated that the volume of pressurized air retained by the jacket 30 may vary with the application. It is also contemplated that other types of apparatus may be provided which employ pneumatic pressure to equivalently dampen the pulses of pressure in the pump output line, as does the dampener 26. It is further contemplated that the cylindrical jacket 30 will be of sufficient length to enable the pneumatic pressure to sufficiently dampen the pressure surges produced by the pump 24. A spray applicator or spray gun 40 (best seen in FIG. 3) is placed in fluid communication with the flow of slurry emitted from the dampener 26, preferably through a braided or otherwise reinforced plastic hose 41 connected to a main pinch valve 42.

Another main component of the system 10 is a pressurized accelerant holding tank 44 into which is inserted a supply of accelerant for accelerating or hastening the setting time of the gypsum plaster slurry. Although a variety of known accelerants are contemplated, a preferred accelerant in the present system 10 is liquid aluminum sulfate and water. For other accelerants, see copending U.S. application Ser. No. 09/502,609 for Efficient Catalyst for the Set Acceleration of Spray Applied Plaster, now U.S. Pat. No. 6,355,099 which is incorporated by reference herein. Also, depending on the application of the system 10, other adjuvants beside accelerant, including but not limited to retarders, strength enhancers, fillers, starch, hardeners, setting agents, binders, dispersants, etc. can be introduced into the flow of the main liquid, in this case a slurry.

Known slurry spray systems inject accelerant in the interior of the spray gun, which leads to premature setting of at least some slurry particles, and clogging of the gun. Another known system injects accelerant fluid externally into the slurry. However, an undesirable result of this approach is uneven setting of the plaster on the substrate through uneven distribution of the accelerant into the slurry.

In the present system, the accelerant is pressurized in the tank 44, passed through a regulator 46 and is in fluid communication with an accelerant pinch valve 48 located in close operational proximity to the spray gun 40. As will be described in further detail below, the pressurized accelerant is mixed with additional pressurized gas (preferably compressed air) to the point where the accelerant is vaporized. The vaporized accelerant is then introduced to the slurry, preferably at the point where the slurry is emitted from the spray gun 40. Thus, a uniform distribution of accelerant is obtained, and its introduction adjacent the outlet of the spray gun 40 solves both of the problems of prior systems. It is also contemplated that the accelerant may be alternately introduced in pressurized form through a liquid pressure pot or through an open tank with a mechanical pump, both of which are considered to be equivalent to the pressurized holding tank 44.

Figure 2:
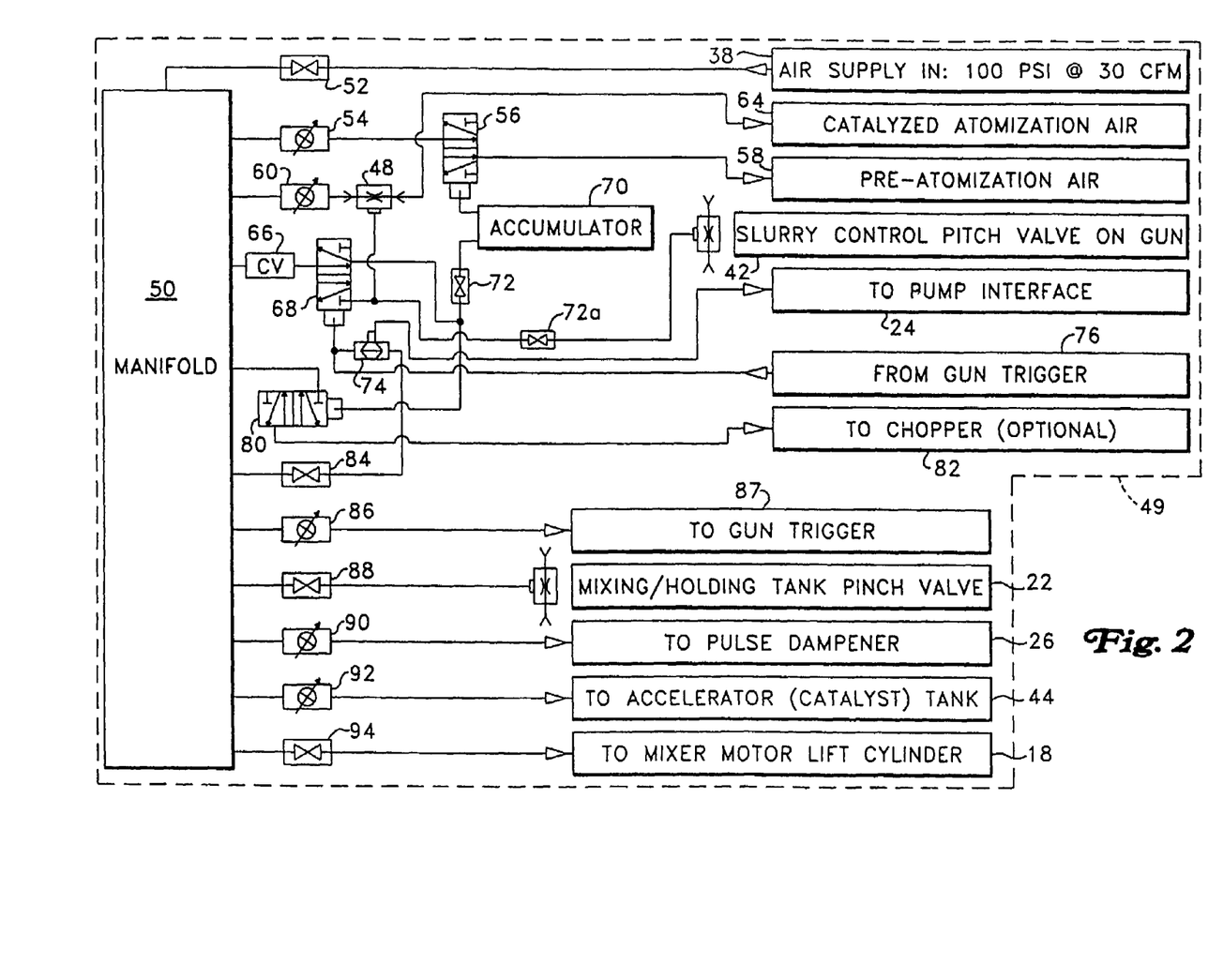
FIG. 2 is a partial schematic of the slurry spray system depicted in FIG. 1.

Referring to FIGS. 1 and 2, for operator safety and simplified maintenance, the present system 10 is pneumatically controlled through a main pneumatic control box 49. Included in the control box 49 is a manifold 50 to which is connected the main supply of compressed air from the compressor 38 through a conventional ball valve 52. Also connected to the manifold 50 is a pressure regulator 54 which is connected, through a pilot valve 56 to a first air supply inlet 58 on the spray gun 40. The inlet 58 is also known as the preatomization air inlet.

A second regulator 60 is connected through the pilot controlled pinch valve 48 to an air inlet 64 known as the atomization inlet of the spray gun 40. If the accelerant is provided from a paint-type pressure tank, as the holding tank 44, then the pinch valve 48 is preferably attached to a fine pitched needle valve for regulating the flow of pressurized accelerant fluid. Also connected to the manifold 50 is a check valve 66 which is connected to a pilot valve 68 operating the pinch valve 48 through a flow control valve 72a. The pilot valve 56 controls the preatomizing air and is regulated by an accumulator 70 through a flow control valve 72. The accumulator 70 maintains a designated air volume to extend timing adjustment of flow control on the pilot valve 56 as is known in the art.

If desired, a third pilot valve 80 may be connected to an optional fiberglass roving chopper 82 for providing a source of ground fiberglass fibers to the slurry. A push button valve 84 is connected to the shuttle valve 74 to allow the operator to manually operate the pump 24 during clean-out or purging cycles. Otherwise, the pump would only be activated when the trigger valve 78 on the spray gun was actuated. Also connected to the manifold 50 is a third pressure regulator 86 which is connected to an IN port 87 on the trigger valve 78. A toggle valve 88 is connected to the tank pinch valve 22.

A fourth pressure regulator 90 is connected to the pulse dampener 26, and a fifth regulator 92 is connected to the accelerator holding tank 44 to maintain pressure on the accelerant. Lastly, a toggle valve 94 controls the lift mechanism 18 for the mixer motor 14. In this manner, the manifold 50 controls operational pneumatic flow throughout the system 10.

Figures 3, 4:
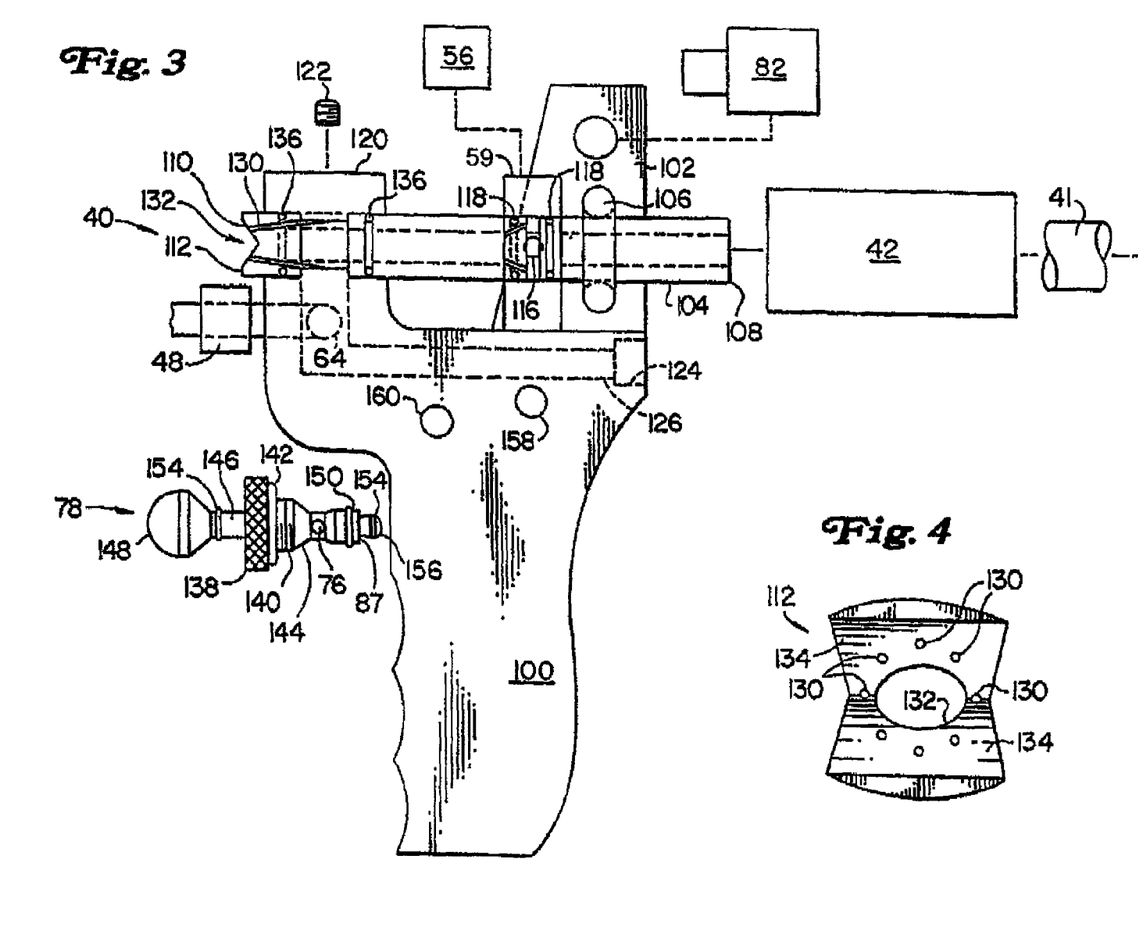
FIG. 3 is a diagrammatic side elevational view of the applicator or spray gun used in the system of FIGS. 1 and 2.
FIG. 4 is an end view of the nozzle used with the applicator of FIG. 3.

Referring now to FIG. 3, the spray gun 40 is depicted, and in the preferred embodiment, is based on a prior design produced by ES Manufacturing, Inc. of St. Petersburg, Fla., in which the plaster slurry was merely externally atomized by compressed air. The present spray gun 40 is designed to be used with all slurry viscosities, but most particularly, with very high viscosities, and at high volume outputs, especially when the slurry is cohesive (sticky). Included on the spray gun 40 is a handle 100 having a vertically extending chopper bracket 102 onto which is clamped a main slurry passageway or tube 104 by at least one U-clamp 106. In the preferred embodiment, the U-clamp 106 is fastened to the bracket 102 by threaded fasteners such as hex nuts (not shown), however other types of conventional fastening technologies are contemplated.

The main slurry tube 104 has an inlet or supply end 108 to which is connected, and in fluid communication with, the main slurry pinch valve 42. Opposite the supply end 108 is an outlet end 110, to which is secured a nozzle 112. It is contemplated that the outlet end 110 may have many configurations, including straight and in line with the passageway 104, in the preferred embodiment, the outlet end 110 gradually and slightly narrows toward the nozzle 112 to facilitate the creation of a uniform spray pattern.

Downstream of the main pinch valve 42 is the air supply inlet 58, which is configured as a halo fitting 59 configured for circumscribing the main passageway 104. In addition, the inlet 58 is in fluid communication with the main passageway 104 via a ring of arcuately spaced, forwardly angled (toward the outlet end 110), first compressed gas inlet openings 116 for introducing a flow of compressed gas (preferably air from the compressor 38) into the main passageway. This halo fitting 59 is also known as the preatomizing point, because the compressed air that is introduced here is forced into the main slurry flow to atomize it and make it easier to spray. To seal the air flow into the passageway 104, a pair of O-rings 118 are disposed on either side of the ring of openings 116. As will be seen from FIG. 3, the halo fitting 59 is disposed generally intermediate the supply end 108 and the outlet end 110. The compressed air that is introduced into the halo fitting 59 is controlled by the pneumatic pilot valve 56 (best seen in FIG. 2).

Another feature of the present spray gun 40 is that it introduces two sources of compressed gas (air) into the slurry to properly atomize the slurry for improved spray performance. As described above, the first introduction of compressed gas occurs at the halo fitting 59 A second pressurized gas inlet 120 is disposed closer to the outlet end 110 than is the halo fitting 59 and is placed in relation to the passageway 104 for introducing a second supply of pressurized gas into the slurry. ft is preferred that the gas inlet 120 is constructed so that the second supply of pressurized gas is introduced into the slurry externally of the passageway 104. In the preferred embodiment, the second gas inlet 120 is linearly displaced from the halo fitting 59 however other dispositions are contemplated.

Yet another feature of the present system 10 is that the second inlet 120 is also the point at which the accelerant from the accelerant holding tank 44 is introduced in vaporized form, into the slurry. By introducing the accelerant adjacent the nozzle 112, the accelerant does not actually enter the passageway 104, and thus the clogging problem of prior art spray applicators is solved. While the preferred position of the second inlet 120 is adjacent the outlet end 110 and the nozzle 112, it is contemplated that, if the problem of premature slurry setting can be addressed, the second inlet may be positioned along the passageway 104 and closer to the halo fitting 59 so that the blended gas (accelerant and compressed air) is mixed with the combination of the slurry and the pressurized gas between the first inlet and the outlet end.

In shape, the second inlet 120 is preferably integrally cast, molded or formed with the handle 100, and is configured to circumscribe the passageway 104, and provides a second attachment point of the passageway 104 to the spray gun 40. In the preferred embodiment, a threaded fastener 122 is provided for anchoring the outlet end 110 of the passageway 104 to the spray gun 40.

The second pressurized air inlet 120 is placed in fluid communication with a supply of pressurized, so-called external atomization air from the compressor 38. An inlet 124 in the spray gun 40 is in fluid communication with the air supply from the compressor 38. An air passageway 126 in the handle 100 provides a fluid conduit between the inlet 124 and the second inlet 120. Intermediate the inlet 124 and the second inlet 120 is the accelerant inlet 64 which receives pressurized accelerant from the holding tank 44 and is controlled by the pneumatic pinch valve 48 (best seen in FIG. 2). Thus, prior to reaching the second inlet 120, the compressed air and accelerant from the holding tank 44 is mixed or blended with additional external atomization air from the compressor 38. In this manner, the accelerant is vaporized so that it is more uniformly dispersible in the slurry.

Alternatively, it is also contemplated that the accelerant fluid may be introduced to the slurry spray at the nozzle 112 using a device known in the industry as a catalyst injection device, a suitable example of which is manufactured by ITW-Binks Manufacturing Co. of Franklin Park, IL. Such a device includes an accelerator tank holding accelerator fluid, which may be pressurized, like the holding tank 44, Compressed air, which will be used as the external air of atomization to be fed to the halo fining 59, passes over a venturi, creating a vacuum which draws accelerator fluid from the tank. Flow from the venturi is monitored by a metering device as is known in the art.

The accelerator is vaporized into the stream of compressed air, after which it is carried through a reinforced hose to the spray gun 40 entering at point 124 (FIG. 3). This alternative construction is considered substantially equivalent to the preferred system described above, and is preferred when using viscous accelerants. Yet another alternative is to introduce a relatively viscous accelerant, such as described in commonly assigned, co-pending U.S. patent application Ser. No. 09/502, 609 entitled Efficient Catalyst for the Set Acceleration of Spray Applied Plaster, now U.S. Pat. No. 6,355,099 and incorporated by reference, through a mechanical pump, such as a piston, diaphragm or other type of metering pump directly to the spray gun 40 at point 64. It is also contemplated that, when slurries of other constituents, such as Portland cement or magnesium phosphate products, it could be introduced at the first air supply inlet 58.

Referring now to FIGS. 3 and 4, the second inlet 120 is provided with a plurality of diametrically spaced, inclined air jets 130 which receive the vaporized accelerant and dispense it from the nozzle 112 adjacent a main slurry outlet 132. In the preferred embodiment, the main slurry outlet 132 is located at the outlet end 110 of the passageway 104. The air jets 130 are preferably disposed in spaced, surrounding relationship to the main slurry outlet 132, which is of a relatively larger diameter than the jets 130. In this manner, the vaporized accelerant can be more evenly distributed in the slurry. In the preferred embodiment, the nozzle 112 is configured with a pair of inclined walls 134 so that the air jets 130 impact the slurry flow on an angle. As is the case with the inlet 58, the inlet 120 is provided on either side with an O-ring 136.

The trigger valve 78 is provided on the handle 100 of the spray gun 40 and is placed in fluid communication with the pneumatic control manifold 50 (best seen in FIG. 2). In the preferred embodiment, the trigger valve 78 is a plunger or piston type known in the art, and a suitable model is No. G300-001 produced by E.S. Manufacturing of St. Petersburg, Fla. The trigger valve 78 has a knurled outer boss 138 integrally affixed to a threaded nipple portion 140 which threadably engages a threaded bore (not shown) in the handle 100. An O-ring 142 maintains an air seal at that connection. A main body 144 of the valve 138 defines an axial chamber (not shown) in which reciprocates a poppet 146. An outer end 148 of the poppet 146 serves as the trigger which is actuated by the operator. In combination with the O-ring 142, a relatively smaller O-ring 150 on the main body 144 isolates the outlet 76. Two additional O-rings 154 on the poppet 146 pneumatically isolate the poppet. In a normally closed position, air pressure from the compressor 38 forces a small end 156 of the poppet 146 against the valve body 144 where it is pneumatically sealed by the adjacent small O-ring 154.

To emit slurry, the incoming air 87 from the pressure regulator 86 and the air exiting from the regulator 86 provides the pneumatic pressure to operate the pilot valve 68. Upon depression of the trigger 148, the regulator 86 is placed in fluid communication with the pilot valve 68. Air is fed to the trigger valve 78 through an air inlet 158 located on the handle 100 of the spray gun 40, and is emitted from the outlet port 76 to a gun outlet 160 and into the manifold 50 to initiate flow of slurry.

Referring to FIG. 3, if desired, the system 10 may be equipped with the chopper attachment or chopper gun 82 for introducing chopped fiberglass roving fibers into the slurry stream. The incorporation of such fibers is intended to increase the strength of the set plaster. Such attachments are known in the art, and are pneumatically operated. In the system 10, the chopper attachment 82 is preferably mounted to the chopper bracket 102, and is connected to the pneumatic control box 48 so that it is operated by the pilot valve 80. Once mounted, the chopped fiberglass fibers are combined with the slurry externally of the passageway 104 as is known in the art.

Referring now to Table 1, a list of actual system performance parameters is provided, along with physical slurry data. The plaster mixture entry is a mixture of calcium sulfate hemihydrate, an internal binder which is preferably a free flowing, water redispersable polymer powder such as polyethylene glycol and an adhesive binder. A more detailed disclosure of the plaster mixture is found in copending U.S. application Ser. No. 09/502,740, now U.S. Pat. No. 6,379,458, for Machinable Plaster Composition, which is incorporated by reference herein.

The data indicates that approximately 21-23 pounds of slurry are sprayed per minute at a pump speed of about 40-45%. The pump speed is controlled by a variable speed DC motor (not shown) which in turn is controlled by an AC to DC converter/controller (not shown). Since the converter/controller provides variable DC output to the pump motor in increments measured as a percentage, that is why the speed is indicated as a percentage in Table 1. In Table 1, the dampener 26 is pressurized to 20 psi, the accelerator holding tank 44 is pressurized to about 40-42 psi, the accelerator flow rate is approximately 3 lbs./min., and is proportional to a slurry flow rate of 21 lbs./min. For these examples, the gun nozzle pressure at the inlet 120 was between 68 and 80 psi and the pre-atomization pressure at the first inlet 58 was approximately 100 psi.

In one example, prior to being sprayed the slurry had a consistency of 30 cc, referring to 100 parts by weight of plaster mixture in 30 parts by weight of clean, potable water. In actuality, the slurry mix resulted from a mixture of 150 lbs of sprayable, machinable plaster mixture, 45 lbs of water and a mix time of 10 minutes. In the second example, 250 lbs of plaster mixture, 75 lbs of water and a mix time of 12.5 minutes was employed.

TABLE 1

|  | Trial 1 | Trial 2 |
|---|---|---|
| Pump Speed (%) | 40.00 | 45.00 |
| Slurry Delivery Rate (lbs./min.) | 21.00 | 23.00 |
| Pulse Dampener Pressure (PSI) | 20.00 | 20.00 |
| Accelerator Tank Pressure (PSI) | 40.00 | 42.00 |
| Accelerator Flow Rate (%) | 50.00 | 50.00 |
| Gun Nozzle Aspiration (PSI) | 80.00 | 68.00 |
| Gun Pre-atomization [Burp] (PSI) | 100.00 | 100.00 |
| Slurry Consistency (CC) | 30.00 | 30.00 |
| Plaster mixture 200 (lbs.) | 150.00 | 250.00 |
| Water (lbs.) | 45.00 | 75.00 |
| Mix Time (min.) | 10.00 | 0.52 |

Referring now to Table 2, pump speed vs. slurry output is indicated, and demonstrates that as pump speed is increased, slurry output generally increased, however at higher speeds, the slurry output did not increase as dramatically.

TABLE 2

PUMP SPEED VS. SLURRY OUTPUT

| Pump Speed (%) | Slurry Delivery Rate (lbs./min.) | Pulse Dampener Pressure (PSI) |
|---|---|---|
| 40.00 | 21.00 | 20.00 |
| 60.00 | 30.00 | 20.00 |
| 80.00 | 37.50 | 20.00 |
| 100.00 | 42.00 | 20.00 |

In operation, a supply of shiny is provided to the mixing tank 12 and stirred by the impeller 16. When the operator wants to initiate slurry and accelerator flow, the trigger 148 is depressed axially against the system pressure. placing the air flow to the trigger valve 138 in communication with the outlet 152. The outlet 152 is then in fluid communication with the manifold 50, and will operate the various pinch valves to commence the flow of slurry though the pump 24, the dampener 26 and to the spray gun. Simultaneously, compressed air is fed from the compressor 38 to the halo fitting 59 to the accelerator holding tank 44, and to the gun inlet 124 for blending with the accelerant.

Thus, the slurry is first mixed with a preatomizing air at the halo fitting 59 to initially increase flow ability. Next, the vaporized accelerant is blended into a second source of compressed air prior to ejection or emission as a blended gas into the slurry. In the preferred embodiment, this blended gas is introduced into the slurry at the nozzle 112. In this manner, the accelerarit is more evenly distributed in the slurry, and spray gun clogging is prevented. The present system 10 also features the use of the dampener 26 with the positive displacement peristaltic pump 24 to provide a relatively uniform flow of slurry. The open-topped tank 12 also provides an atmospheric pressure environment for slurry mixing and loading, which further facilitates relatively uniform flow rates, Upon completion of the swaying process, the tank 12 can be filled with water that is flushed through the system 10.

Figure 6:
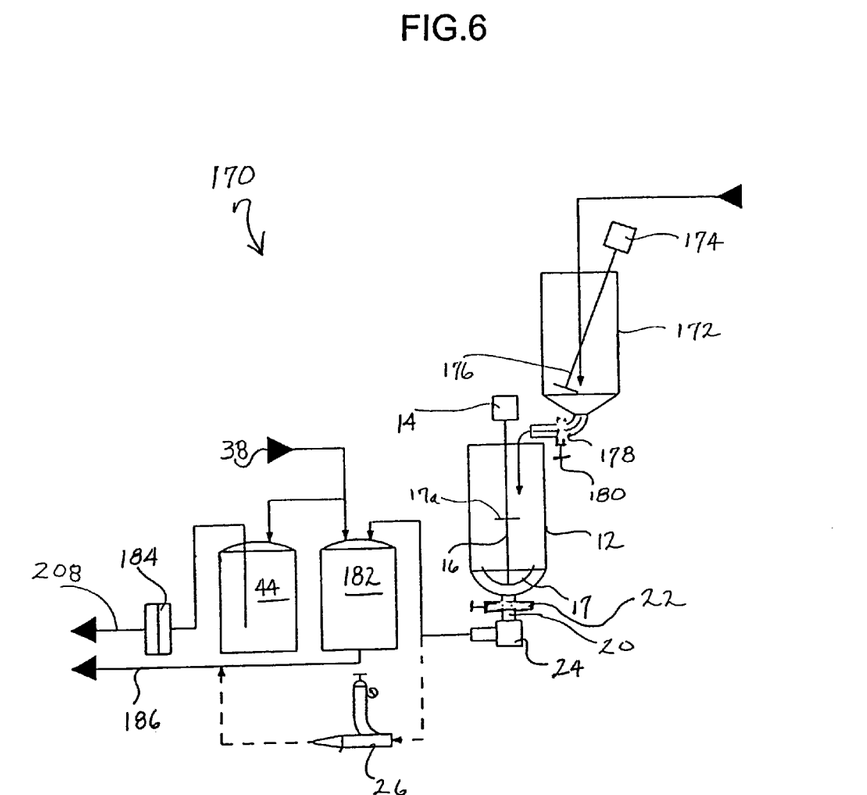
FIG. 6 is a schematic of an alternate slurry formulation and mixing apparatus.

Referring now to FIG. 6, an alternate system for providing gypsum slurry is generally designated 170. Shared components of systems 10 and 170 are designated with identical reference numbers. A main distinction between the systems 10 and 170 is that in the system 170, the mixing tank 12 is supplemented with a high shear mixing tank 172 provided with a high shear mixer assembly including a motor 174 and an impeller 176. Slurry constituents including water and alpha or beta calcium sulfate hemihydrate are fed into the high shear mixing tank 172 and are mixed to form a slurry prior to dispensing the slurry through an outlet 178. A valve 180 is positioned on the outlet 178 to control the flow from the tank 172. The outlet 178 communicates with the mixing and storage tank 12, which now serves the role as a "day" tank. This arrangement allows the day tank 12 to be refilled during the day with slurry of a given composition so that production is not interrupted for reformulating new batches of slurry.

Output of the pump 24 is fed to the surge suppressor 26 or to a steel pressure tank 182, either of which is suitable for absorbing surges in flow generated by the pump 24. Compressed air from the compressor 38 is supplied to the pressure tank 182 when employed, and also to the accelerator holding tank 44. Output of the accelerator holding tank 44 is passed through an accelerator metering valve 184. Output of the surge suppressor 26 or the pressure tank 182 is passed through a slurry feed line 186, and as is the feed from the metering valve 184, then either to the spray gun 40 described above, or to a dispensing gun, generally designated 190 (best seen in FIG. 7). It is also contemplated that the dispenser gun 190 can be connected to the spray system 10 in place of the spray gun 40, depending on the application.

Figure 7:
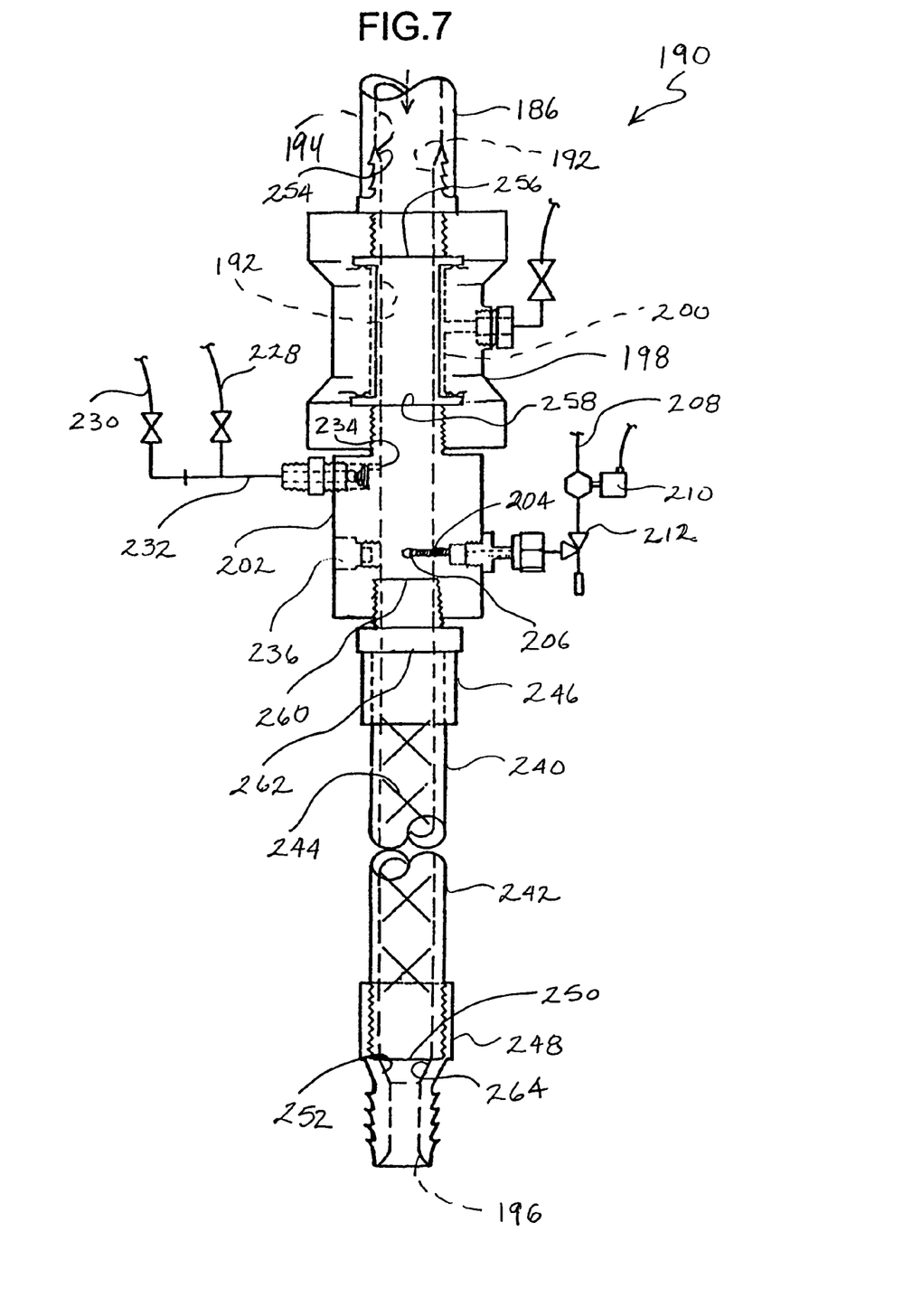
FIG. 7 is a vertical section of the present slurry dispenser gun.

Referring now to FIG. 7, the present dispensing apparatus or dispensing gun 190 preferably includes a series of components which together define a main fluid passageway 192 (shown hidden) having an inlet 194 for receiving a supply of the flowing fluid, which in the preferred embodiment is the plaster slurry being transmitted through the line 186 from either the pressure tank 182 or the slurry dampener 26. However, it is contemplated that the present dispensing gun 190 may be used with any main fluid which is designed to be incorporated with a setting agent when dispensed. Examples of such fluids are polyesters, epoxies and the like.

An outlet 196 is provided to the dispensing gun 190 and is opposite the inlet 194 for dispensing the fluid from the passageway 192. The first component defining the passageway 192 is a control valve 198 configured for selectively controlling the flow of fluid in the passageway, which in the preferred embodiment is a pinch-type valve similar to the valve 42 used on the spray gun 40. The pneumatic operation of the valve 198 and the constrictable rubberized sleeve 200 (shown hidden) do not provide sites for the accumulation of slurry, which sites would lead to premature setting and clogging of the passageway 192. Also, this type of valve is useful with abrasive slurries like plaster slurries since the valve components are not as susceptible to erosion from the slurry.

Following the control valve 198, the next component defining the passageway 192 is an additive injector housing 202 disposed in the passageway between the inlet 194 and the outlet 196, and preferably connected directly to the control valve 198. The injector housing 202 has an injector 204 with an emitter 206 (best seen in FIG. 8) disposed in close relationship with a longitudinal axis of the passageway 192 and oriented toward the outlet 196. Being threaded into the injector housing 202, the injector 204 receives a controlled flow of pressurized accelerator from the tank 182 or the dampener 26, the accelerator being fed in a pressurized stream through a line 208. A pneumatically operated solenoid valve 210 connected to an accelerator metering valve 212 for controlling the flow of fluid to the injector 204.

Figure 8:
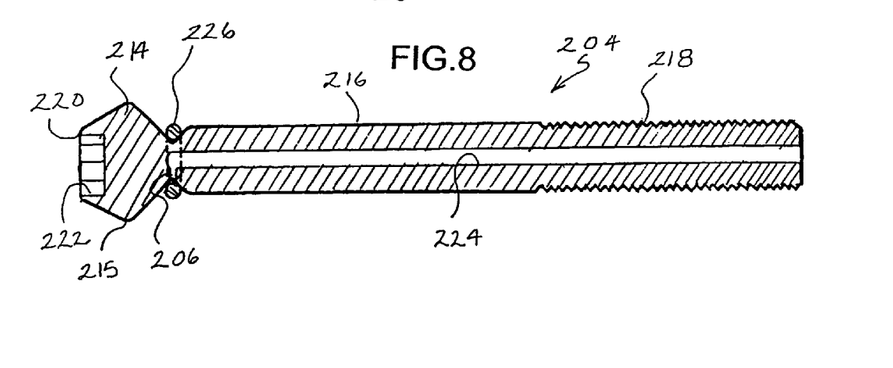
FIG. 8 is a vertical section of the present accelerator injector for use in the dispenser gun of FIG. 7.

Referring now to FIGS. 7 and 8, an important feature of the present dispensing gun 190 is that the injector 204 is configured for introducing the accelerator fluid into the passageway 192 in the approximate midpoint or along a central axis of the passageway so that, by the time the slurry reaches the outlet 196, it has been uniformly mixed into the slurry. This same principle applies regardless of the identity of the main fluid in the passageway 192 and that of the additive fluid introduced to promote setting of the main fluid. Accordingly, the emitter 206 is an aperture positioned in a head 214 of the injector 204 and is disposed to face the outlet 196. In addition to the benefit of more complete mixing, by introducing the additive in this manner, the chances for premature setting and clogging are reduced.

Another feature of the present dispenser gun 190 is that the injector 204 is provided with a streamlined configuration which minimizes the surface area available for collecting particles or bits of slurry which then might prematurely set and clog the passageway 192. More specifically, the injector 204, which is adapted from a standard Allen-head screw, has a non-threaded middle shank portion 216 located between a threaded end portion 218 and the head 214. The non-threaded portion 216 has a smooth exterior to avoid the collection of slurry. In addition, the head 214 is fluid-dynamically smoothed and is configured for promoting free flow of fluid there over. In the preferred embodiment, the head 214 is tapered or wedge-shaped from a central peripheral edge 215 to form a streamlined profile in the main passageway 192. To further reduce the chances for clogging, an end face 220 is reduced so that a socket or noncircular driving recess 222 is just deep enough to be engaged by a standard Allen wrench (not shown) for tightly threading the injector 204 into the housing 202.

Internally, the injector 204 defines an axial bore 224 which forms a right angled turn to be in fluid communication with the emitter 206, which is preferably a bore in the injector between the non-threaded portion of the shank 216 and the head 214. The diameters of both the axial bore 224 and the emitter 206 are dimensioned to minimize residual volume of accelerator contained therein to minimize the initial burst of accelerator injected when the process is initiated. The axial bore 224 is in fluid communication with the line 208 to receive pressurized accelerator fluid or other additive depending on the application.

To prevent accelerator or a combination of accelerator and slurry from backing up into the emitter 206 or the bore 224, the injector 204 includes a check or check valve 226 for preventing the flow of fluid back into the emitter. While in the preferred embodiment the check 226 circumscribes the injector 204 at the emitter 206 and is an O-ring, it is contemplated that other types of fluid check devices may be employed depending on the application. An advantage of the O-ring as the check is that it is also smooth and thus does not tend to collect slurry for premature setting and unwanted clogging.

In the preferred embodiment, the injector housing 202 is also provided with at least one of a water purge 228 and an air purge 230. These purges 228 and 230 are valved inputs of the respective fluids which are used to flush the passageway 192 in the event clogging does occur, or merely to clean the passageway 192 at the completion of a job or at the end of a day's work. While separate inlets are contemplated, in the preferred embodiment the two purges merge into a single inlet or input 232 which is in fluid communication with the injector housing 202. It is also preferred to provide a check valve 234 to prevent slurry from flowing back up the input 232, and an access plug 236 which is axially aligned with the injector 204. By removing the access plug 236, the injector 204 may be removed, replaced or tightened.

A static mixer 240 is another component which defines a portion of the passageway 192 and is connected to the dispensing gun 190 between the injector housing 202 and the outlet 196. Static mixers are well known in the art and include a rigid outer housing 242, in this case made of plastic, and at least one inner mixer module 244 (shown schematically), which defines a helical flow path for fluids passed through the mixer. In the preferred embodiment, the module 244 extends the entire length of the housing 242, however it is contemplated that a series of shorter modules may be placed end-to-end in the housing.

The purpose of the static mixer 240 is to more completely mix the accelerator or other additive into the main fluid, in this case the slurry. The length of the mixer housing 242 varies to suit the application, but is typically just long enough to achieve complete mixing of the additive into the main fluid.

As indicated above, the static mixer 240 is connected to the injector housing 202. This connection may be established in a number of ways using conventional plumbing fittings. In the preferred embodiment, the connection is established through the use of a coupler 246 which is threaded into a corresponding bore in the injector housing 202. It is also preferred that the injector 204 is positioned just upstream of the static mixer 240 in the passageway 192 so that the accelerator or other additive is uniformly mixed with the slurry in the static mixer.

At the opposite end of the static mixer 240 is provided at least one nozzle fitting 248 which is secured to an outlet end 250 of the static mixer. It is preferred that the nozzle fitting 248 be threaded onto the outlet end 250, however the use of chemical adhesives, ultrasonic welding, heat staking or other fastening technologies are contemplated. The nozzle fitting 248 defines a narrowed portion 252 of the passageway 192 which will create a slight backpressure on the fluid in the static mixer 240 and as such promote more complete mixing. Depending on the application, the narrowed portion 252 may be eliminated.

Another feature of the present invention is that efforts are taken in the configuration of the dispenser gun 190 to minimize the collection of slurry in the passageway 192 which ultimately leads to premature setting and clogging. This clogging is a particular problem when using plaster or gypsum slurries, since one of the properties of gypsum is that the mere presence of gypsum in the passageway acts as an accelerator or a setting catalyst for the next batch of slurry which is sent down the passageway 192. It has been found that to promote long-term operation of the present dispensing apparatus 180, connection points between the inlet 194 and the valve 198 and between the valve and the static mixer 240 are configured for smooth transition of fluid and the prevention of at least one of the collection and premature setting of the mixture. In the preferred embodiment, every transition point or connection point between components is configured for smooth transition in this manner. The smooth transition is achieved by not only selecting apertures of adjacent components having like inner diameters to form the main fluid passageway 192, but also by supplemental machining or polishing where needed. The ultimate goal is to have no transitions or seams along the whole passageway 192 which may provide a collection site for slurry.

Several locations along the passageway are targeted for providing this smooth transition. First, an inner diameter of the inlet 194, which is formed by an inlet nipple 254 threaded into the valve 198 and is configured for receiving the slurry feed line 186 is flared for smoothness. Next, a transition point 256 where the nipple 254 engages the valve 198 is also dimensioned for smooth transition. Likewise, a transition point 258 where the valve 198 threadably engages the injection housing 202 is similarly dimensioned to have a smooth configuration, and is optionally smoothed by machining, polishing or the like. In addition a transition point 260 where the injector housing 202 threadably engages the static mixer 240, and preferably through the coupler 246 is also similarly dimensioned and optionally smoothed at 262. Lastly, the narrowed passageway 252 of the nozzle 248 is ramped or angled at a transition point 264 to provide a smooth transition.

If desired, the dispensing gun 190 may be equipped for spraying the slurry which has been passed through the static mixer 240. With that goal in mind, the outlet end 250 of the static mixer is fitted with a halo fitting 59, a passageway segment as seen at 104, and a nozzle 112 (best seen in FIG. 3). As was described in relation to FIG. 3, the halo fitting 59 has a plurality of openings 116 for directing compressed air into the passageway. The exact length of the passageway segment 104 may vary to suit the application. In this embodiment, the nozzle 112 need not be provided wit the openings 130, since the accelerator has already been introduced. It is also contemplated that other portions of the spray gun 40 and the dispenser gun 190 maybe exchanged depending on the application.

Thus, it will be seen that the present continuous slurry dispenser apparatus of the invention provides a system for dispensing or spraying a main liquid such as a slurry in a continuous, production-based environment in which an additive such as an accelerator or hardener is introduced into the main flow. Once introduced, the system includes a dispenser gun or a spray gun which is configured for mixing the additive into the main slurry flow so that the additive is uniformly mixed prior to dispensing the slurry upon the work surface. In addition, the dispenser gun is specially designed to minimize the accumulation of slurry in a main slurry passageway so that unwanted premature setting of slurry, and ultimate clogging of the passageway, is prevented.

While specific embodiments of the continuous slurry dispenser apparatus of the present invention have been shown and described, it will be appreciated by those skilled in the art that changes and modifications may be made thereto without departing from the invention in its broader aspects and as set forth in the following claims.

What is claimed is:

1. An apparatus for mixing an additive into a flowing fluid to form a settable mixture, comprising:
    a main fluid passageway having an inlet for receiving a supply of the flowing fluid and an outlet for dispensing the fluid;
    a control valve defining a portion of said main fluid passageway and configured for selectively controlling the flow of fluid in said passageway;
    an additive injector disposed in said passageway between said inlet and said outlet, said injector having an emitter disposed at an approximate midpoint of said passageway and oriented toward said outlet for adding the additive to the flowing fluid;
    a purge input for receiving at least one fluid distinct from the flowing fluid and the additive and configured for purging said passageway of the settable mixture;
    a static mixer disposed in said passageway between said injector and said outlet for enhancing the uniform mixing of the additive and the fluid;
    connection points between said inlet, said valve and said static mixer being configured for the prevention of at least one of the collection and premature setting of the mixture in said passageway.

2. The apparatus of claim 1 wherein said injector is provided in an injector housing which defines a portion of said main passageway.

3. The apparatus of claim 2 wherein said injector housing is connected to said valve at a first end and to said static mixer at a second end, transitions between said valve, said injector housing and said static mixer being smoothed to prevent collection of fluid and premature setting.

4. The apparatus of claim 1 wherein said injector includes a check for preventing the flow of fluid back into said emitter.

5. The apparatus of claim 4 wherein said check is an O-ring.

6. The apparatus of claim 1 wherein said injector is provided with a smooth shank and a head, said emitter being a bore disposed between said shank and said head.

7. The apparatus of claim 1 wherein said injector includes a check for preventing the flow of fluid back into said emitter, said check disposed to circumscribe said injector at said emitter.

8. The apparatus of claim 7 wherein said head is configured for promoting free flow of fluid thereover.

9. The apparatus of claim 7 wherein said head is tapered from a central peripheral edge to form a streamlined profile in said main passageway.

10. The apparatus of claim 7 wherein said head is provided with a noncircular driving recess and said injector is provided with a threaded tip for securing said injector into said apparatus.

11. The apparatus of claim 1 wherein said purge input includes both an air purge connection and a water purge connection in fluid communication with said main passageway.

12. The apparatus of claim 1 wherein said main passageway is defined by said control valve, an injector housing receiving said injector, said static mixer and connections between said valve, said housing and said mixer, said connections between said valve and said housing and between said housing and said mixer being configured for smooth transition of fluid and the prevention of at least one of the collection and premature setting of the mixture.

13. An apparatus for mixing an additive into a flowing, settable slurry, comprising:
  a main slurry passageway having an inlet for receiving a supply of the slurry and an outlet for dispensing the slurry;
  a control valve defining a portion of said main slurry passageway and configured for selectively controlling the flow of slurry in said passageway;
  an additive injector disposed in said passageway between said inlet and said outlet, said injector having an emitter disposed in the approximate midpoint of said passageway and oriented toward said outlet;
  a purge input for receiving at least one fluid and configured for purging said passageway, said purge input including both an air purge connection and a water purge connection in fluid communication with said passageway;
  a static mixer disposed between said injector and said outlet for enhancing the uniform mixing of the additive and the slurry;
  connection points between said inlet, said valve and said static mixer being configured for smooth transition of slurry and the prevention of collection of slurry and premature setting of slurry; and
  said injector being configured to provide a streamlined profile in said main slurry passageway.

14. The apparatus of claim 13 wherein said injector is provided with a smooth shank and a head, said emitter being a bore disposed between said shank and said head.

15. The apparatus of claim 14 wherein said head is tapered from a central peripheral edge to form said streamlined profile.

16. The apparatus of claim 13 wherein said injector is positioned just upstream of said static mixer so that said additive is uniformly mixed with said slurry in said static mixer.

17. The apparatus of claim 13 wherein said static mixer has a reduced diameter nozzle which defines said outlet.

18. An apparatus for mixing an additive into a flowing fluid to form a settable mixture, comprising:
  a main fluid passageway having an inlet for receiving a supply of the flowing fluid and an outlet for dispensing the fluid;
  a control valve defining a portion of said passageway and configured for selectively controlling the flow of fluid in said passageway;
  an additive injector disposed in said passageway between said inlet and said outlet, said injector having an emitter disposed at an approximate midpoint of said passageway and oriented toward said outlet;
  a purge input for receiving at least one fluid and configured for purging said passageway, said purge input including both an air purge connection and a water purge connection in fluid communication with said passageway;
  a static mixer disposed in said passageway between said injector and said outlet for enhancing the uniform mixing of the additive and the fluid; and
  connection points between said inlet, said valve and said static mixer being configured for the prevention of at least one of the collection and premature setting of the mixture;
  said passageway is defined by said control valve, an injector housing receiving said injector, said static mixer and connections between said valve, said housing and said mixer, said connections configured for smooth transition of fluid and the prevention of at least one of the collection and premature setting of the mixture.

* * * * *